United States Patent [19]

Katayama et al.

[11] Patent Number: 4,958,218
[45] Date of Patent: Sep. 18, 1990

[54] IMAGE PROCESSING METHOD AND APPARATUS WITH DOT-PROCESSING

[75] Inventors: Akihiro Katayama, Kawasaki; Hidefumi Ohsawa, Urawa, both of Japan

[73] Assignee: Canon Kabushiki Kaisha, Tokyo, Japan

[21] Appl. No.: 284,603

[22] Filed: Dec. 15, 1988

[30] Foreign Application Priority Data

Dec. 16, 1987 [JP] Japan .................. 62-319810
Dec. 16, 1987 [JP] Japan .................. 62-319811
Dec. 28, 1987 [JP] Japan .................. 62-334974

[51] Int. Cl.$^5$ ............................................. H04N 1/46
[52] U.S. Cl. ............................. 358/75; 358/80; 358/456
[58] Field of Search .............. 358/443, 456, 447, 454, 358/458, 459, 464, 465, 429, 433, 75, 80; 382/22, 23, 50; 346/46, 76 PH

[56] References Cited

U.S. PATENT DOCUMENTS

| | | | |
|---|---|---|---|
| 3,742,129 | 6/1973 | Roberts et al. | 178/5.4 CD |
| 3,911,480 | 10/1975 | Brucker | 358/75 |
| 3,922,484 | 11/1975 | Keller | 178/358 |
| 4,084,196 | 4/1978 | Tissue et al. | 358/456 |
| 4,371,260 | 2/1983 | Yoshimoto et al. | 358/466 |
| 4,595,948 | 7/1986 | Itoh et al. | 358/78 |
| 4,654,721 | 3/1987 | Goertzel et al. | 358/80 |
| 4,667,250 | 5/1987 | Murai | 358/456 |
| 4,672,433 | 6/1987 | Yamamoto et al. | 358/80 |
| 4,700,399 | 10/1987 | Yoshida | 358/80 |
| 4,734,759 | 3/1988 | Kobori et al. | 358/78 |
| 4,754,336 | 6/1988 | Nishizawa | 358/261.1 |
| 4,817,174 | 3/1989 | Nakatani | 382/22 |
| 4,819,193 | 4/1989 | Imao | 358/75 |
| 4,876,610 | 10/1989 | Ohsawa et al. | 358/443 |
| 4,878,125 | 10/1989 | Katayama et al. | 358/443 |
| 4,893,177 | 1/1990 | Tada et al. | 358/75 |

FOREIGN PATENT DOCUMENTS 2262824 7/1974 Fed. Rep. of Germany .
3525414 1/1986 Fed. Rep. of Germany .
2164222 4/1986 United Kingdom .

OTHER PUBLICATIONS

"An Adaptive Algorithm for Spatial Grey Scale", SID 75 Digest, Floyd et al.

Primary Examiner—Howard W. Britton
Assistant Examiner—Kim Yen Vu
Attorney, Agent, or Firm—Fitzpatrick, Cella, Harper & Scinto

[57] ABSTRACT

There are provided an image processing method and apparatus for processing an image by digital signals and for reproducing the image with a high picture quality. The apparatus comprises: an input device to input a plurality of color image data; a first processor on perform a dotting process to the color image data input by the input device; and a second processor to digitize the color image data dot-processed by the first processor, wherein the first processor changes the dotting process for each of the color image data. With the apparatus, first and second features of the input image are detected and different dotting processes are executed in accordance with the first and second features, so that the image process can be executed at a high speed and a color image having excellent gradations and resolution can be obtained while suppressing the occurrence of a color moiré.

25 Claims, 16 Drawing Sheets

FIG. 4A

| $D_{11}$ | $D_{12}$ | $D_{13}$ |
|---|---|---|
| $D_{21}$ | $D_{22}$ | $D_{23}$ |
| $D_{31}$ | $D_{32}$ | $D_{33}$ |

FIG. 5A

| $D_{11}$ | $D_{12}$ | $D_{13}$ |
|---|---|---|
| $D_{21}$ | $D_{22}$ | $D_{23}$ |
| $D_{31}$ | $D_{32}$ | $D_{33}$ |

FIG. 6A

| $D_{11}$ | $D_{12}$ | $D_{13}$ |
|---|---|---|
| $D_{21}$ | $D_{22}$ | $D_{23}$ |
| $D_{31}$ | $D_{32}$ | $D_{33}$ |

FIG. 4B

| 0 | 0 | 0 |
|---|---|---|
| $S_Y$ | 0 | 0 |
| 0 | 0 | 0 |

FIG. 5B

| 0 | 0 | $S_M$ |
|---|---|---|
| 0 | 0 | 0 |
| 0 | 0 | 0 |

FIG. 6B

| 0 | 0 | 0 |
|---|---|---|
| 0 | 0 | 0 |
| 0 | 0 | $S_C$ |

FIG. 4C

| $D_{av}$ | $D_{av}$ | $D_{av}$ |
|---|---|---|
| $D_{max}$ | $D_{av}$ | $D_{av}$ |
| $D_{av}$ | $D_{av}$ | $D_{av}$ |

FIG. 5C

| $D_{av}$ | $D_{av}$ | $D_{max}$ |
|---|---|---|
| $D_{av}$ | $D_{av}$ | $D_{av}$ |
| $D_{av}$ | $D_{av}$ | $D_{av}$ |

FIG. 6C

| $D_{av}$ | $D_{av}$ | $D_{av}$ |
|---|---|---|
| $D_{av}$ | $D_{av}$ | $D_{av}$ |
| $D_{av}$ | $D_{av}$ | $D_{max}$ |

FIG. 7
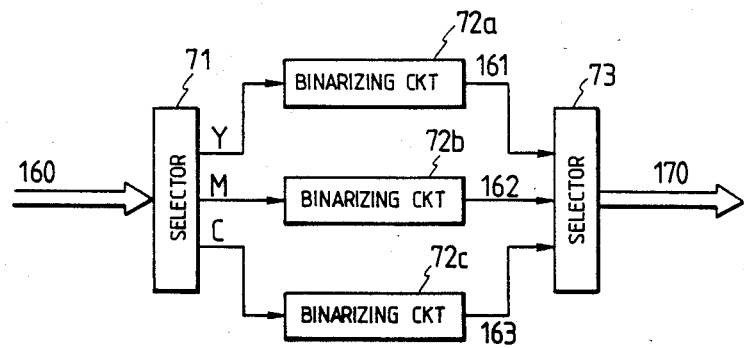
FIG. 8
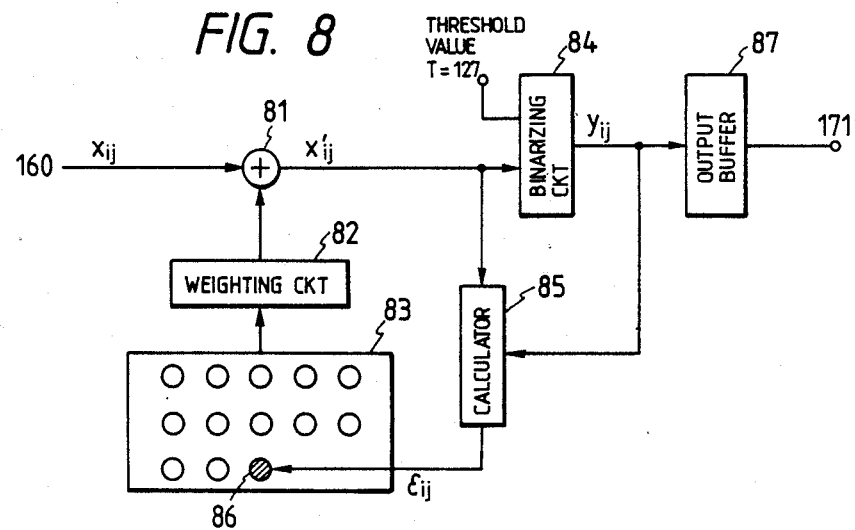
FIG. 9
| | | | | |
|---|---|---|---|---|
| 1 | 3 | 5 | 3 | 1 |
| 3 | 5 | 7 | 5 | 3 |
| 5 | 7 | * | | |

FIG. 10A

| $D_{av1}$ | 0 | 0 |
|---|---|---|
| $D_{max}$ | $D_{av1}$ | 0 |
| $D_{av1}$ | 0 | 0 |

FIG. 10B

| $D_{max}$ | $D_{av2}$ | $D_{av2}$ |
|---|---|---|
| $D_{max}$ | $D_{max}$ | $D_{av2}$ |
| $D_{max}$ | $D_{av2}$ | $D_{av2}$ |

FIG. 11A

| 0 | $D_{av1}$ | $D_{max}$ |
|---|---|---|
| 0 | $D_{av1}$ | $D_{av1}$ |
| 0 | 0 | 0 |

FIG. 11B

| $D_{av2}$ | $D_{max}$ | $D_{max}$ |
|---|---|---|
| $D_{av2}$ | $D_{max}$ | $D_{max}$ |
| $D_{av2}$ | $D_{av2}$ | $D_{av2}$ |

FIG. 12A

| 0 | $D_{av1}$ | $D_{max}$ |
|---|---|---|
| 0 | $D_{av1}$ | $D_{av1}$ |
| 0 | 0 | 0 |

FIG. 12B

| $D_{av2}$ | $D_{max}$ | $D_{max}$ |
|---|---|---|
| $D_{av2}$ | $D_{max}$ | $D_{max}$ |
| $D_{av2}$ | $D_{av2}$ | $D_{av2}$ |

FIG. 16A

| 0 | 0 | 0 | 0 | 0 | 0 |
|---|---|---|---|---|---|
| 0 | S | 0 | 0 | 0 | 0 |
| 0 | 0 | 0 | 0 | 0 | 0 |

FIG. 16B

| $D_{av2}$ | $D_{av1}$ | $D_{av2}$ | $D_{av2}$ | $D_{av2}$ | $D_{av2}$ |
|---|---|---|---|---|---|
| $D_{av1}$ | $D_{max}$ | $D_{av1}$ | $D_{av2}$ | $D_{av2}$ | $D_{av2}$ |
| $D_{av2}$ | $D_{av1}$ | $D_{av2}$ | $D_{av2}$ | $D_{av2}$ | $D_{av2}$ |

FIG. 17A

| 0 | 0 | 0 | 0 | 0 | 0 |
|---|---|---|---|---|---|
| 0 | 0 | 0 | 0 | S | 0 |
| 0 | 0 | 0 | 0 | 0 | 0 |

FIG. 17B

| $D_{av2}$ | $D_{av2}$ | $D_{av2}$ | $D_{av2}$ | $D_{av1}$ | $D_{av2}$ |
|---|---|---|---|---|---|
| $D_{av2}$ | $D_{av2}$ | $D_{av2}$ | $D_{av1}$ | $D_{max}$ | $D_{av1}$ |
| $D_{av2}$ | $D_{av2}$ | $D_{av2}$ | $D_{av2}$ | $D_{av1}$ | $D_{av2}$ |

| A₁₁ | A₁₂ | A₁₃ | A₁₄ | A₁₅ | A₁₆ |
|-----|-----|-----|-----|-----|-----|
| A₂₁ | A₂₂ | A₂₃ | A₂₄ | A₂₅ | A₂₆ |
| A₃₁ | A₃₂ | A₃₃ | A₃₄ | A₃₅ | A₃₆ |

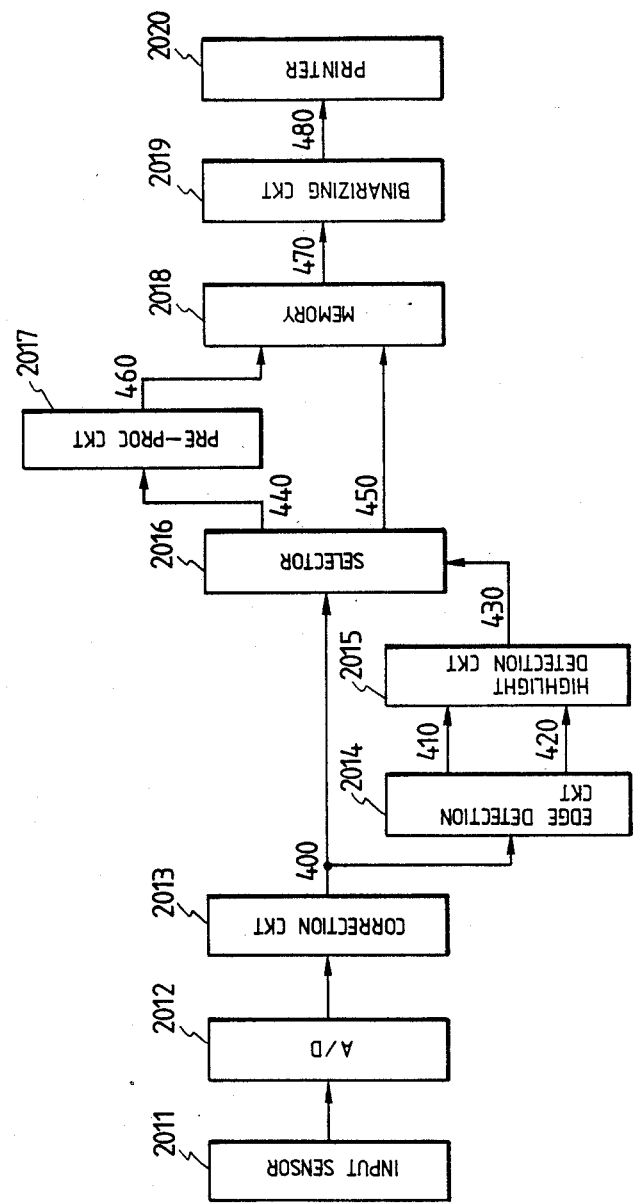

FIG. 23

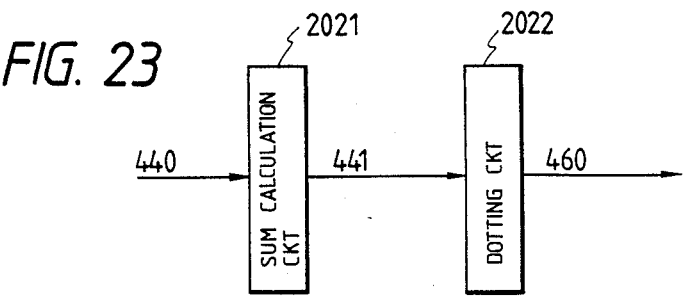

FIG. 24

| D₁₁ | D₁₂ | D₁₃ | D₁₄ | D₁₅ | D₁₆ | D₁₇ | D₁₈ |
| --- | --- | --- | --- | --- | --- | --- | --- |
| D₂₁ | D₂₂ | D₂₃ | D₂₄ | D₂₅ | D₂₆ | D₂₇ | D₂₈ |
| D₃₁ | D₃₂ | D₃₃ | D₃₄ | D₃₅ | D₃₆ | D₃₇ | D₃₈ |
| D₄₁ | D₄₂ | D₄₃ | D₄₄ | D₄₅ | D₄₆ | D₄₇ | D₄₈ |
| D₅₁ | D₅₂ | D₅₃ | D₅₄ | D₅₅ | D₅₆ | D₅₇ | D₅₈ |
| D₆₁ | D₆₂ | D₆₃ | D₆₄ | D₆₅ | D₆₆ | D₆₇ | D₆₈ |
| D₇₁ | D₇₂ | D₇₃ | D₇₄ | D₇₅ | D₇₆ | D₇₇ | D₇₈ |
| D₈₁ | D₈₂ | D₈₃ | D₈₄ | D₈₅ | D₈₆ | D₈₇ | D₈₈ |

FIG. 25

| A₁₁ | A₁₂ | A₁₃ | A₁₄ | A₁₅ | A₁₆ | A₁₇ | A₁₈ |
| --- | --- | --- | --- | --- | --- | --- | --- |
| A₂₁ | A₂₂ | A₂₃ | A₂₄ | A₂₅ | A₂₆ | A₂₇ | A₂₈ |
| A₃₁ | A₃₂ | A₃₃ | A₃₄ | A₃₅ | A₃₆ | A₃₇ | A₃₈ |
| A₄₁ | A₄₂ | A₄₃ | A₄₄ | A₄₅ | A₄₆ | A₄₇ | A₄₈ |
| A₅₁ | A₅₂ | A₅₃ | A₅₄ | A₅₅ | A₅₆ | A₅₇ | A₅₈ |
| A₆₁ | A₆₂ | A₆₃ | A₆₄ | A₆₅ | A₆₆ | A₆₇ | A₆₈ |
| A₇₁ | A₇₂ | A₇₃ | A₇₄ | A₇₅ | A₇₆ | A₇₇ | A₇₈ |
| A₈₁ | A₈₂ | A₈₃ | A₈₄ | A₈₅ | A₈₆ | A₈₇ | A₈₈ |

IMAGE PROCESSING METHOD AND APPARATUS WITH DOT-PROCESSING

BACKGROUND OF THE INVENTION

1. Field of the Invention

The present invention relates to an image processing method and apparatus for processing an image as a digital signal and, more particularly, to an image processing method and apparatus for reproducing an image of a high picture quality.

2. Related Background Art

In general, digital copying apparatuses in which an image is sampled by a CCD sensor or the like and digitized data is output from a digital printer such as a laser beam printer or the like thereby reproduce an image are widespread in place of conventional analog copying apparatuses, due to the development of digital apparatuses.

The digital copying apparatus generally uses a method of reproducing gradations by a dither method or a concentration pattern method in order to reproduce halftone. However, such a method has the following drawbacks.

(1) In the case where an original is a dotted image which is formed by printing or the like, a periodic fringe pattern which does not exist on the original appears in the copied image.

(2) When diagrams, characters, or the like are included on an original, the edges become uneven due to the dither process, so that the picture quality deteriorates.

(3) And the like.

The phenomenon (1) is called a moiré phenomenon and it is considered that such a phenomenon occurs by the following causes.

(A) Beats between the dotted original and the input sampling.

(B) Beats between the dotted original and the dither threshold value matrix.

Particularly, in the phenomenon (B), in general, when the threshold values of the dither are arranged as a dot concentration type, an output image also has a pseudo-dotted; structure. Such a dotted structure causes beats with the input dotted original, so that the moiré phenomenon occurs.

On the other hand, there has been known an error diffusion method as a binarizing method which has recently been highlighted. According to this method, a concentration difference between an image concentration of an original and an output image concentration for every pixel is calculated and the error amounts resulting from the calculations are diffused by being added, after weighting, to the peripheral pixels. Such a method has been published in the literature by R. W. Floyd and L. Steinberg, "An Adaptive Algorithm for Spatial Grey Scale", SID. 75, Digest.

On the other hand, although there has also been known a method called a least mean error method, such method is considered to be substantially equivalent to the error diffusion method.

According to the error diffusion method, since no periodicity exists in the binarizing process, no moiré occurs for the dotted image, so that there is an advantage that the resolution is high as compared with that of the dither method or the like. However, in the case of processing uniform concentration portions (highlight portion, shadow portion) of an image, a unique fringe pattern occurs, so that there is a drawback that the picture quality deteriorates.

To eliminate the above drawbacks, U.S. Patent Nos. 4,878,125 and 4,876,610 and U.S. patent applications Ser. Nos. 145,593 and 192,601 have already been filed on behalf of the assignee of the present invention.

Among them, according to the U.S. patent application Ser. No. 192,601, after a dotted image is formed in the highlight portion of the image, the binarizing process is executed by the error diffusion method, thereby preventing the generation of a fringe pattern or particle-shaped noises when processing by the error diffusion method.

SUMMARY OF THE INVENTION

It is an object of the invention to eliminate the drawbacks in the foregoing conventional techniques and to provide image processing method and apparatus which can eliminate inconveniences which are caused when the drawbacks are eliminated.

Another object of the invention is to provide an image processing method and apparatus which can obtain an image of a high picture quality by improving the error diffusion method as a halftone processing method of an image.

Still another object of the invention is to provide an image processing method and apparatus which can obtain a good color image in which both gradations and resolution are excellent and a occurrence of a color moiré is suppressed.

To accomplish the above objects, according to a preferred embodiment of the invention, there is provided an image processing apparatus comprising: input means for inputting a plurality of color image data; first processing means for dotting the plurality of color image data; and second processing means for digitizing the plurality of color image data, wherein the first processing means executes different dotting processes for the plurality of color image data and the second processing means digitizes the color image data by a method of correcting the differences between the data before digitization and the data after the digitization.

Still another aspect of the invention is an image processing method and apparatus in which first and second features of an image are detected and the dotting process is executed in accordance with the detected first and second features, thereby enabling the image process to be performed at a high speed.

Still another aspect of the invention is an image processing apparatus comprising: first processing means for digitizing image data by the error diffusion method; second processing means for adding a screen angle to the image data; and recording means for recording the image processed by the first and second processing means.

The above and other objects, and features and advantage of the present invention will become more fully understood from the following detailed description of the preferred embodiments, with reference to the accompanying drawings.

BRIEF DESCRIPTION OF THE DRAWINGS

FIG. 3 is a block diagram of a sum calculation circuit 22a;

FIGS. 4A to 4C, 5A to 5C, 6A to 6C, 10A, 10B, 11A, 11B, 12A, and 12B are explanatory diagrams of dotting circuits 23a to 23c;

FIG. 7 is a block diagram showing the details of a binarizing circuit 18;

FIG. 8 is a block diagram showing the details of a binarizing circuit 72a;

FIG. 9 is a diagram showing an example of weight coefficients;

FIGS. 16A, 16B, 17A, and 17B are diagrams for explaining the processes in dotting circuits 1023 and 1024;

FIG. 22 is a block arrangement diagram showing another preferred embodiment of the invention;

FIGS. 23 and 27 are block diagrams showing pre-processing circuits;

FIG. 24 is a diagram showing data of a (block) before the dotting process is executed;

FIG. 25 is a diagram showing data of a (block) after the dotting process is executed;

DETAILED DESCRIPTION OF PREFERRED EMBODIMENTS

The preferred embodiments of the present invention will be described in detail hereinbelow with reference to the drawings.

Figure 1:
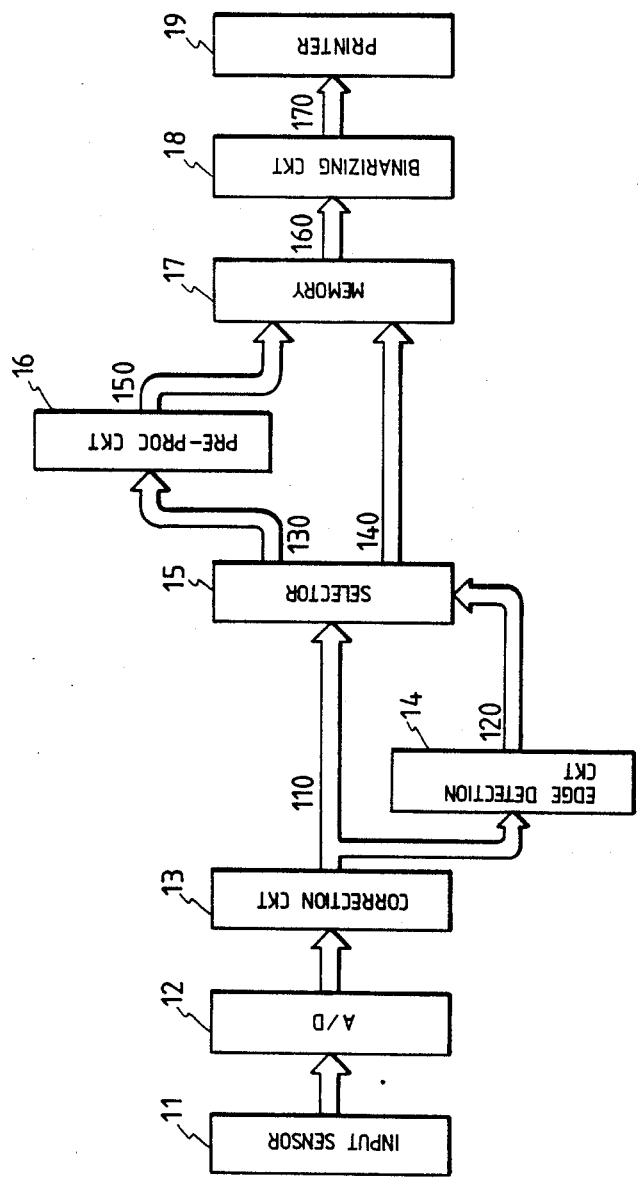
FIG. 1 is a block diagram showing a first preferred embodiment of the present invention.

FIG. 1 is a block diagram showing an embodiment of the invention.

An input sensor 11 reads a color original (not shown) and consists of a photoelectric converting device such as a CCD or the like. A red (R) signal, a green (G) signal, and a blue (B) signal which were separated into three color signals by the input sensor 11 are transmitted to an A/D converter 12 and converted into digital signals bits each consisting of eight bits for, the respective colors. Shading correction, complementary color conversion from the RGB signals to the YMC signals, and masking processing are executed in a correction circuit 13. A yellow (Y) signal, a magenta (M) signal, and a cyan (C) signal are output from the correction circuit 13. The Y, M, and C signals are collectively represented as signal 110. Each of the Y, M, and C signals 110 is transferred on a block unit basis in which 3×3 pixels construct one block for every color. In the transfer on a block unit basis, it is possible to use a construction such that a line buffer of three lines is provided for every color or a construction such that after the signal is once stored into a page memory for every color, 3×3 blocks are fetched. An edge detection circuit 14 discriminates whether edges exist in the blocks of the Y, M, and C signals or not from the Y, M, and C signals of the signal 110 output from the correction circuit 13. As a discriminating method, there has been known a method using Laplacians of 3×3size, a method whereby the maximum and minimum values in the block are obtained, the difference therebetween is calculated, and the existence of an edge is discriminated by checking whether the difference is larger than a threshold value T (for instance, T=30 or the like when the input data is converted into eight bits) or not, or the like. The latter method is used in this case. The edge discriminating method is not limited to the foregoing two methods but other methods can be also used. After the existence or absence of edges is discriminated, a "1" signal is output when an edge exists in the block for each of the Y, M, and C signals and a "0" signal is output when no edge exists. Such a "1" or "0" signal is output as a signal 120. The signal 120 is input to a selector 15. In response to the signal 120, the selector 15 selects whether to output the corrected signal 110 (Y, M, C signal) to a pre-processing circuit 16 or directly to a memory 17, for every block. The edgeless portions discriminated by the edge detection circuit 14 are pre-processed. Therefore, it is possible to prevent the edges becoming uneven. For instance, when considering the yellow component of the signal 120, if the signal 120 from the edge detection circuit 14 is set to "1", the yellow component of the signal 110 is transferred to the memory 17 on a block unit basis. If the signal 120 is set to "0", the yellow component of the signal 110 is transferred to the pre-processing circuit 16 on a block unit basis. The processes are also executed on the basis of the signal 120 in a manner similar to the above with respect to the magenta and cyan components of the signal 110. A signal 130 (Y, M, C signal) output from the selector 15 is input to the pre-processing circuit 16, by which dots are formed as will be explained in detail hereinbelow. A signal 150 output from the pre-processing circuit 16 is input to the memory 17 every block for each of the Y, M, and C signals. A binarizing circuit 18 performs the binarizing process for each of the Y, M, and C signals of a signal 160 read out of the memory 17. A binary signal 170 is sent to a printer 19. The printer 19 forms a color image on the basis of the signal 170.

Figure 2:
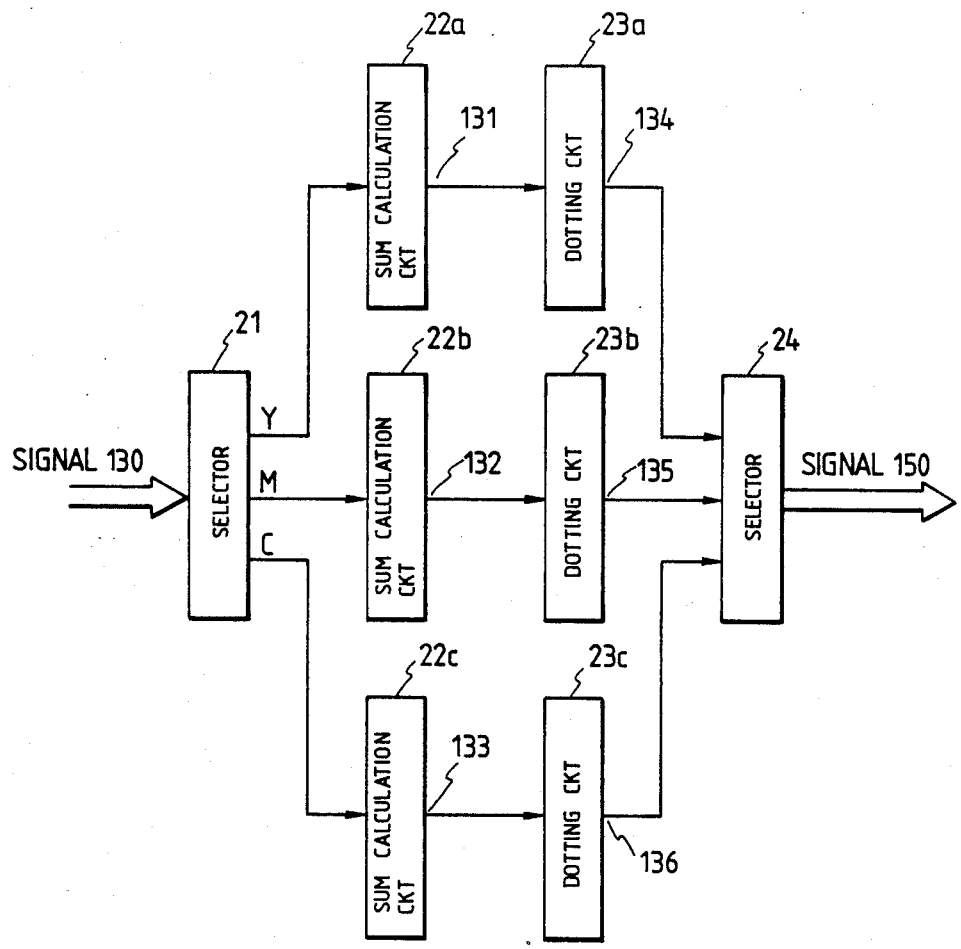
FIG. 2 is a block diagram showing the details of a pre-processing circuit 16.

FIG. 2 is a block diagram showing the details of the pre-processing circuit 16. The signal 130 is input to a selector 21, by which it is divided into the Y, M, and C signals and input to sum calculation circuits 22a, 22b, and 22c, respectively. For the Y, M, and C signals, the sum calculation circuits 22a to 22c calculate the sums of the concentrations in the block and output as signals 131, 132, and 133. The signals 131 to 133 are input to dotting circuits 23a to 23c, by which pixel concentrations in the block are determined for the signals 131 to 133 and the dotting or dot generation is executed. The pixel concentrations in the block determined by the dotting circuits 23a to 23c are output as signals 134, 135, and 136, respectively, and are output as a signal 150 to the memory 17 through a selector 24.

Figure 3:
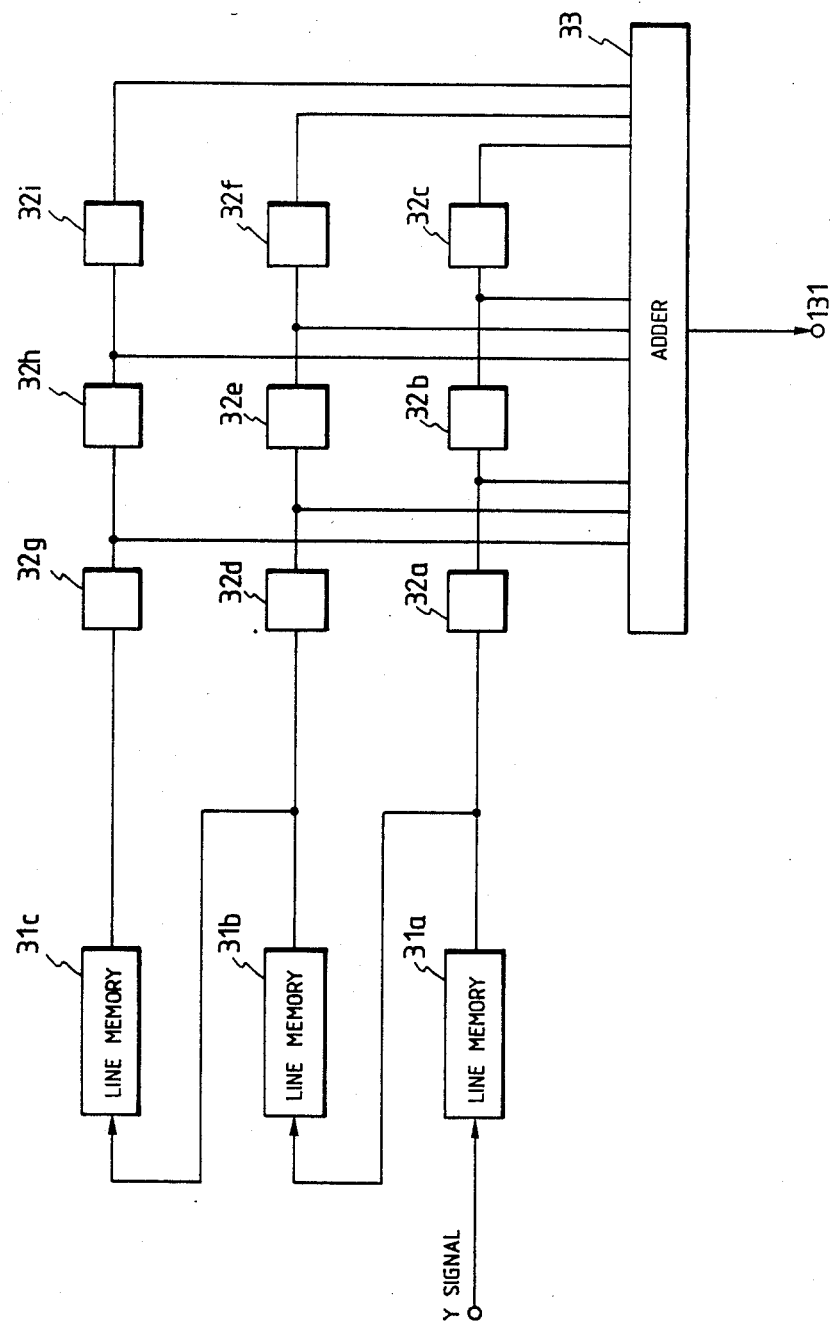

FIG. 3 shows a block diagram of the sum calculation circuit 22a in FIG. 2.

In FIG. 3, the Y signal is input to line memories 31a to 31c and sequentially transferred to elements 32a to 32i. The sum of the concentrations of nine pixels in the block is calculated by an adder 33 and output as signal 131 to the dotting circuit 23a. Although only the sum calculation circuit 22a has been shown, the sum calculation circuits 22b and 22c can be also realized by circuits similar to that of FIG. 3.

FIG. 4 is a diagram for explaining the processes in the dotting circuit 23a. In FIG. 4A, $D_{11}, \ldots, D_{33}$ denote concentrations of nine pixels in the block and an image concentration at a pixel position (i,j) (i and j = 1, 2, 3) is set to $D_{ij}$. The signal 131 is considered by the equation (1);

$$(\text{signal } 131) = \sum_{i=1}^{3} \sum_{j=1}^{3} D_{ij} \quad (1)$$

Assuming that the maximum concentration which can be expressed by a printer is $D_{max}$ (255 in the embodiment) and this signal 131 is set to $S_Y$, when $0 \leq S_Y \leq D_{max}$, as shown in FIG. 4B, the concentration of the (2, 1) pixel is set to $S_Y$ and the concentrations of the other pixels are set to 0. On the other hand, when $S_Y > D_{max}$, as shown in FIG. 4C, the concentration of the (2, 1) pixel is set to $D_{max}$ and the concentrations $D_{av}$ of the other pixels are expressed by the equation (2);

$$D_{av} = \left( \sum_{i=1}^{3} \sum_{j=1}^{3} D_{ij} - D_{max} \right)/8 \quad (2)$$

FIGS. 5A to 5C and 6A to 6C are diagrams for explaining the processes in the dotting circuits 23b and 23c, respectively. In FIG. 5, the processes differ from those in the dotting circuit 23a with respect to a point such that when $0 \leq S_M \leq D_{max}$, as shown in FIG. 5B, the concentration of the (1, 3) pixel is set to $S_M$ (the signal 132 assumes value $S_M$) and the concentrations of the other pixels are set to 0 and that when $S_M > D_{max}$, as shown in FIG. 5C, the concentration of the (1, 3) pixel is set to $D_{max}$ and the concentrations of the other pixels are set to $D_{av}$ ($D_{av}$ is given by the equation (2)). In FIG. 6, the processes differ from those in the dotting circuit 23a with respect to a point such that when $0 \leq S_C \leq D_{max}$, as shown in FIG. 6B, the concentration of the (3, 3) pixel is set to $S_C$ (the signal 133 assumes $S_C$) and the concentrations of the other pixels are set to 0 and that when $S_C > D_{max}$, as shown in FIG. 6C, the concentration of the (3, 3) pixel is set to $D_{max}$ and the concentrations of the other pixels are set to $D_{av}$ ($D_{av}$ is given by the equation (2)). As mentioned above, by executing the processes as shown in FIGS. 4 to 6, the dot forming positions of the Y, M, and C colors can be changed in the block. Thus, it is possible to prevent the dots of Y, M, and C being formed at the same position.

FIG. 7 is a block diagram of the binarizing circuit 18. The data 160 of a color pixel unit of Y, M, and C which has been read out of the memory 17 is input to a selector 71, by which it is separated into the Y, M, and C signals and input to binarizing circuits 72a to 72c. The binarizing circuits 72a to 72c binarize the 8-bit data of the Y, M, and C colors and output signals 161, 162, and 163 of "0" (dot off) or "$D_{max}$" (dot on), respectively. The signals 161 to 163 are output as the YMC signal 170 through a selector 73.

FIG. 8 is a block diagram of the binarizing circuit 72a. The method called a least means error method (which is equivalent to the error diffusion method) will now be explained here.

Image data yellow ($x_{ij}$) is added by an adder 81 to the value which is obtained by multiplying a weight coefficient $\alpha_{ij}$ designated by a weighting circuit 82 to an error $\alpha_{ij}$ (the difference between correction data $X'_{ij}$ which has previously been generated and output data $X_{ij}$) stored in an error buffer memory 83. The adding process can be expressed by the following equation;

$$X'_{ij} = X_{ij} + \left( \sum_{kl} \alpha_{kl} \epsilon_{i+k, i+l} \right) / \sum_{kl} \alpha_{kl}$$

FIG. 9 shows an example of weight coefficients. In FIG. 9, * indicates a position of a pixel which is at present being processed.

Next, the correction data $X'_{ij}$ is compared with the threshold value T (in this case, $D_{max}=255$, T=127) by a binarizing circuit 84, so that data $y_{ij}$ is output. $y_{ij}$ is the data which was binarized such as $D_{max}$ or 0. The binarized data is stored in an output buffer 87 and output data 171 is output. The difference $\epsilon_{ij}$ between the correction data $X'_{ij}$ and the output data $y_{ij}$ is calculated by a calculator 85. The result is stored in an area at a position corresponding to a pixel position 86 in the error buffer memory 83. By repeating those operations, the binarization due to the least mean error method (error diffusion method) is executed. The binarizing circuits 72b and 72c can be realized by the same construction as that of the binarizing circuit 72a.

In the embodiment, the size of the block has been set to 3×3 pixels but can be also set to a size of 5×5 pixels, 5×7 pixels, or the like. In general, m×n pixels can be considered as one block. The dotting processes are not limited to the foregoing processes but can be also realized by a method which will be explained hereinbelow.

FIGS. 10A and 10B show embodiments in the case where a part of FIG. 4C is changed. Although the processes when the signal 131 assumes value $S_y$ and there is the relation of $0 \leq S_Y \leq D_{max}$ are the same as those in the case of the embodiment of FIG. 4B, the case of $S_Y > D_{max}$ is further divided into two cases, when $D_{max} < S_Y \leq 4D_{max}$, the concentration of the (2, 1) pixel is set to $D_{max}$. On the other hand, the concentrations of the (1, 1), (2, 2), and (3, 1) pixels are set to $D_{av1}$ and given by the following equation;

$$D_{av1} = \left( \sum_{i=1}^{3} \sum_{j=1}^{3} D_{ij} - D_{max} \right)/3 \quad (3)$$

Further, the concentrations of the remaining pixels (1, 2), (1, 3), (2, 3), (3, 2), and (3, 3) are set to 0 (FIG. 10A).

When $S_Y > 4D_{max}$, the concentrations of the (1, 1), (2, 1), (2, 2), and (3, 1) pixels are set to $D_{max}$ and the concentrations of the remaining pixels (1, 2), (1, 3), (2, 3), (3, 2), and (3, 3) are set to $D_{av2}$ (FIG. 10B). $D_{av2}$ is given by the following equation (4);

$$D_{av2} = \left( \sum_{i=1}^{3} \sum_{j=1}^{3} - 4D_{max} \right)/5 \quad (4)$$

Similarly, FIGS. 11A, 11B, 12A, and 12B are diagrams in the case where parts of FIGS. 5C and 6C are changed, respectively.

FIG. 11 shows an embodiment in the case where a part of FIG. 5C is changed. The processes in the case where the signal 132 assumes value $S_M$ and there is the relation of $0 \leq S_M \leq D_{max}$ are the same as those in the case of the embodiment of FIG. 5B. However, in FIG. 11, the case where $S_M > D_{max}$ is further divided into two cases. When $D_{max}<S_M\leq 4D_{max}$, the concentration of the (1, 3) pixel is set to $D_{max}$. On the other hand, the concentrations of the (1, 2), (2, 2), and (2, 3) pixels are set to $D_{av1}$ and $D_{av1}$ is given by the equation (3). Further, the concentrations of the remaining pixels (1, 1), (2, 1), (3, 1), (3, 2), and (3, 3) are set to 0 (FIG. 11A).

When $S_M>4D_{max}$, the concentrations of the (1, 2), (1, 3), (2, 2), and (2, 3) pixels are set to $D_{max}$ and the concentrations of the remaining pixels (1, 1), (2, 1), (3, 1), (3, 2), and (3, 3) are set to $D_{av2}$ (FIG. 11B). $D_{av2}$ is given by the equation (4).

FIG. 12 shows an embodiment in the case where a part of FIG. 6C is changed. The processes in the case where the signal 133 assume value $S_C$ and there is a relation of $0\leq S_C\leq D_{max}$ are the same as those in the case of the foregoing embodiment. However, the case where $S_C>D_{max}$ is further divided into two cases. When $D_{max}<S_C\leq 4D_{max}$, the concentration of the (3, 3) pixel is set to $D_{max}$. On the other hand, the concentrations of the (2, 2), (2, 3), and (3, 2) pixels are set to $D_{av1}$ and $D_{av1}$ is given by the equation (3). Further, the concentrations of the remaining pixels (1, 1), (1, 2), (1, 3), (2, 1), and (3, 1) are set to 0 (FIG. 12A).

When $S_C>4D_{max}$, the concentrations of the (2, 2), (2, 3), (3, 2), (3, 3) pixels are set to $D_{max}$ and the concentrations of the remaining pixels (1, 1), (1, 2), (1, 3), (2, 1), and (3, 1) are set to $D_{av2}$ (FIG. 12B). $D_{av2}$ is given by the equation (4).

As mentioned above, according to this embodiment, in the portion having no edge, for instance, in the uniform concentration portion such as highlight portion of an image or shadow portion, the dotting process is executed as a pre-processing and the binarization is executed by the least mean error method (error diffusion method). Therefore, since dots can be aligned in the highlight or shadow portion, the unique fringe pattern which occurs when the error diffusion method is executed can be reduced. Moreover, by aligning the dots, regularity without noise can be achieved. Therefore, generation of particle-shaped noise which are otherwise sensed in the highlight or shadow portion can be prevented. On the other hand, since the dotting process is not executed in the edge portion, characters or diagram can be clearly reproduced at a high resolution. In this embodiment, since the dot forming process is changed in accordance with the concentration of an image, a reproduction image which accurately corresponds to the concentration of the original can be derived.

Further, when all of the dots of a color image are formed at the same position in the dotting process, a color moiré occurs due to the faulty registration of the printer or the like. However, since the dot forming positions are changed for every color of Y, M, and C, the occurrence of the color moiré can be prevented.

The second preferred embodiment will now be described. In the second embodiment, by controlling the dot forming position, a screen angle is provided, thereby obtaining a further good image.

Figure 13:
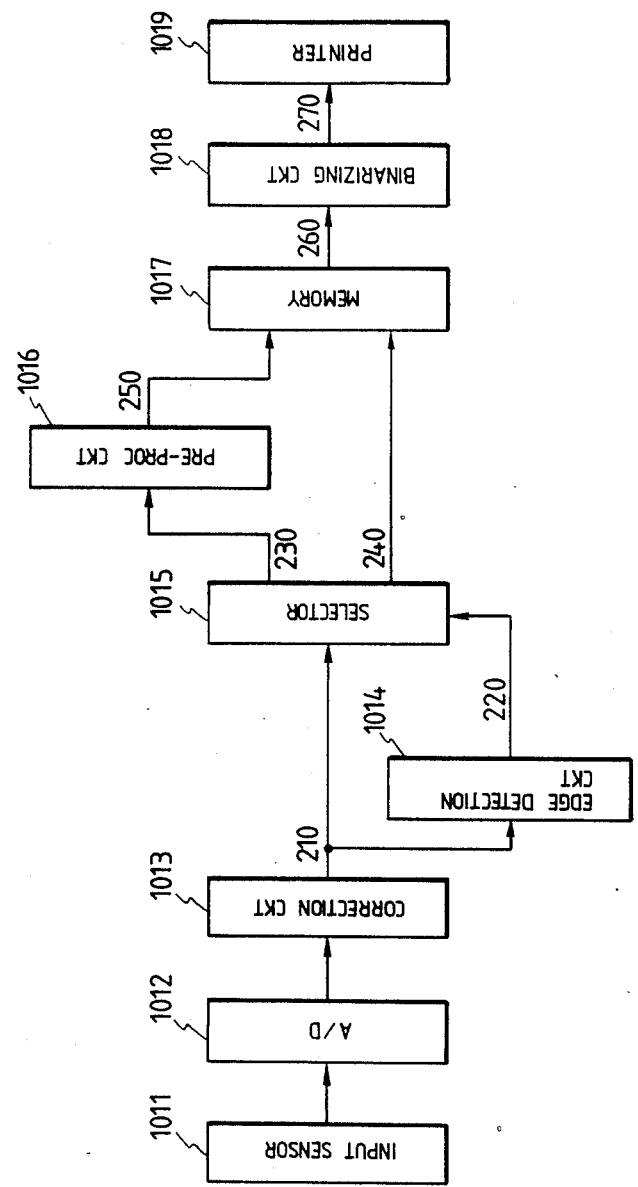
FIG. 13 is a block diagram showing the second preferred embodiment of the invention.

FIG. 13 is a block diagram showing the second embodiment of the invention. In FIG. 13, the case of processing a white and black image will be described as an example. Image data read out by an input sensor 1011 having a photoelectric converting device such as a CCD or the like and a drive system to scan the photoelectric converting device are sequentially sent to an A/D converter 1012. For example, the A/D converter 1012 converts the data of each pixel into digital data of eight bits. Thus, the image data is digitized into the data having gradations of 256 levels. Next, in a correction circuit 1013, the shading correction and the like to correct the sensitivity variation of sensors and the illuminance variation due to a illuminating light source are executed by digital arithmetic operating processes. A corrected signal 210 from the correction circuit 1013 is input to an edge detection circuit 1014 and a selector 1015. At this time, as shown in the first embodiment, data are transferred on a block unit basis in which m×n pixels make up one block. In this embodiment, an explanation will be made assuming that m=3 and n=6.

In the edge detection circuit 1014, a check is made to see if edges exist in a block or not. As an edge discriminating method, there has been known a method of using Laplacians of 3×6 size, a method whereby the difference between the minimum and maximum values in a block is calculated and it is determined such that edges exist when the difference is a threshold value $T_1$ ($T_1=30$) or more and that no edge exists when the difference is smaller than $T_1$, or the like. In this example, the latter method is used.

The reason why the presence or absence of edges in a block is discriminated is to avoid the deterioration in resolution which is caused in the case of dotting a block in which edges exist. Only when no edge exists, is the dotting process, which will be explained hereinbelow, executed.

The edge detection circuit 1014 discriminates the presence or absence of edges and outputs a "1" level signal when edges exist and a "0" level signal when no edge exists. The "1" or "0" signal is output as a signal 220. The signal 220 is input to the selector 1015. When the signal 220 is set to "0", the signal 210 input to the selector 1015 is transferred as a signal 230 to a pre-processing circuit 1016 for every block. On the other hand, when the signal 220 is set to "1", the signal 210 is transferred as a signal 240 to a memory 1017 for every block.

The selector 1015 is provided to execute the dotting process only on the portion having no edge by means of pre-processing circuit 1016.

In the pre-processing circuit 1016, the sum of block data which was input as the signal 230 is calculated. The sum of the concentration data in a block is replaced as a concentration(s) of one or a plurality of pixels in the block and the dotting process is executed in this manner. At this time, a screen angle is added to the dots and an adding method of a screen angle will be described in detail hereinbelow in the description of the dotting circuit. By adding the screen angle, a pitch between dots can be set to a short pitch and the spatial frequency can be raised. Output data 250 from the pre-processing circuit 1016 is input to the memory 1017. Data 260 read out of the memory 1017 on a pixel unit basis is input to a binarizing circuit 1018 and binarized. The result is input as a signal 270 to a printer 1019. An image is reproduced by the printer 1019 by the on/off control of dots.

Figure 14:
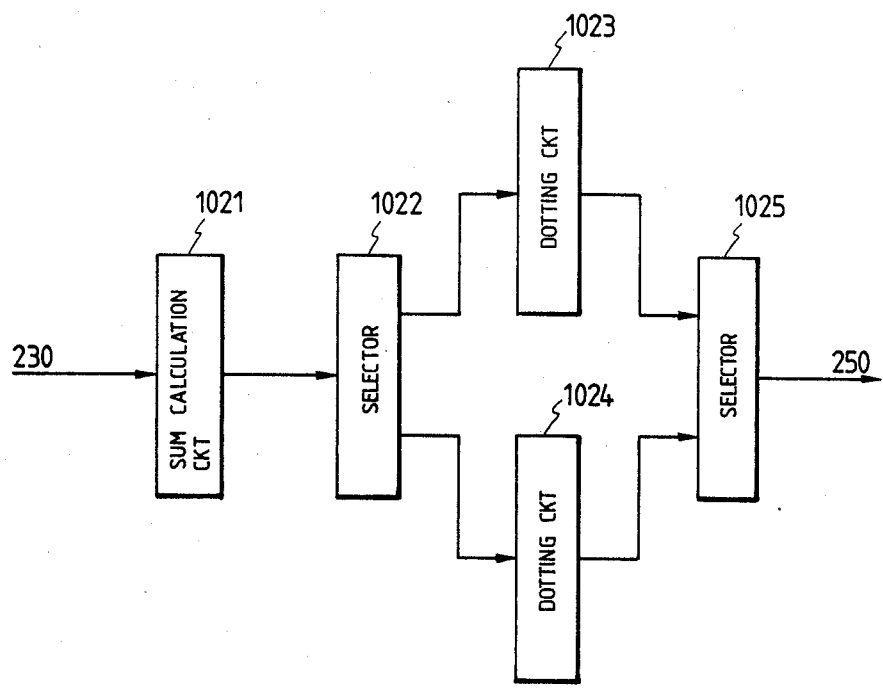
FIG. 14 is a block diagram of a pre-processing circuit 1016.

FIG. 14 is a block diagram showing the details of the pre-processing circuit 1016.

Figure 15:
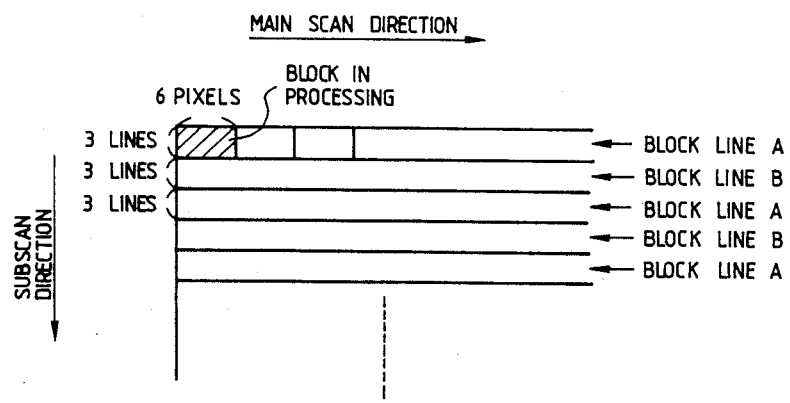
FIG. 15 is a diagram for explaining the operation of a selector 1022.

The signal 230 output from the selector 1015 is input to a sum calculation circuit 1021, by which the sum of the concentrations of eighteen data (3×6 pixels) in a block is calculated. The result of the calculation is input to a dotting circuit 1023 or 1024 through a selector 1022. The data output from the dotting circuit 1023 or 1024 is output as the signal 250 from a selector 1025. The switching operations by the selectors 1022 and 1025 will be described with reference to FIG. 15. As shown in FIG. 15, data is sequentially processed every three lines (3×6 pixels). In this case, three lines are regarded as one area and called a block line. If the block (3×6 pixels) which is being processed exists in a block line A, the selector 1022 allows the data output from the sum calculation circuit 1021 to be input to the dotting circuit 1023, and the selector 1025 selects the output from the dotting circuit 1023 and outputs as the signal 250. On the other hand, when the data from the sum calculation circuit 1021 exists in a block line B, the selector 1022 allows the data output from the sum calculation circuit 1021 to be input to the dotting circuit 1024, and the selector 1025 selects the output from the dotting circuit 1024 and outputs as the signal 250. Namely, the outputs from the dotting circuits 1023 and 1024 are alternately switched by the selectors 1022 and 1025 for every block line.

FIGS. 16A and 16B are diagrams for explaining the operation of the dotting circuit 1023. A signal output from the sum calculation circuit 1021 assumes value S. If the block which is being processed exists in the block line A, the signal S is input to the dotting circuit 1023 by the selector 1022. At this time, if $S \leq D_{max}$ ($D_{max}$ denotes an output concentration of one dot in the printer and $D_{max}=255$ in this embodiment) in the portion of a relatively low concentration, the concentration of the (2, 2) pixel is set to S and the concentrations of all of the remaining pixels are set to 0 as shown in FIG. 16A.

On the contrary, when $S > D_{max}$ in a block of a high concentration, as shown in FIG. 4B, the concentration of the (2, 2) pixel is set to $D_{max}$, the concentrations of the (1, 2), (2, 1), (2, 3), and (3, 2) pixels are set to $D_{av1}$, and the concentrations of the remaining pixels are set to $D_{av2}$. $D_{av1}$ and $D_{av2}$ are given by the following equations in accordance with the concentrations in a block;

(i) When $D_{max} < S \leq 5D_{max}$,
$D_{av1} = (S - D_{max})/4$
$D_{av2} = 0$
(ii) When $S > 5D_{max}$,
$D_{av1} = D_{max}$
$D_{av2} = (S - 5D_{max})/13$ FIGS. 17A and 17B are diagrams for explaining the operation of the dotting circuit 1024. The signal output from the sum calculation circuit 1021 assumes value S. If the block which is being processed exists in the block line B, the signal S is input to the dotting circuit 1024 by the selector 1022. At this time, if $S \leq D_{max}$ ($D_{max}$ denotes an output concentration of one dot in a printer and $D_{max}=255$ in the embodiment) in the portion of a relatively low concentration, the concentration of the (2, 5) pixel is set to S and the concentrations of all of the remaining pixels are set to 0 as shown in FIG. 17A.

On the other hand, when $S > D_{max}$, as shown in FIG. 17B, the concentration of the (2, 5) pixel is set to $D_{max}$, the concentrations of the (1, 5), (2, 4), (2, 6), and (3, 5) pixels are set to $D_{av1}$, and the concentrations of the remaining pixels are set to $D_{av2}$. $D_{av1}$ and $D_{av2}$ are given by the following equations in accordance with the concentrations in a block;

(i) When $D_{max} < S \leq 5D_{max}$,
$D_{av1} = (S - D_{max})/4$
$D_{av2} = 0$
(ii) When $S > 5D_{max}$,
$D_{av1} = D_{max}$
$D_{av2} = (S - 5D_{max})/13$ To add a screen angle, the data output from the dotting circuit 1023 or 1024 to execute the different dotting processes is selected every three lines by the selector 1025 in FIG. 14 and output as the signal 250 to the memory 1017.

Figures 18, 21:
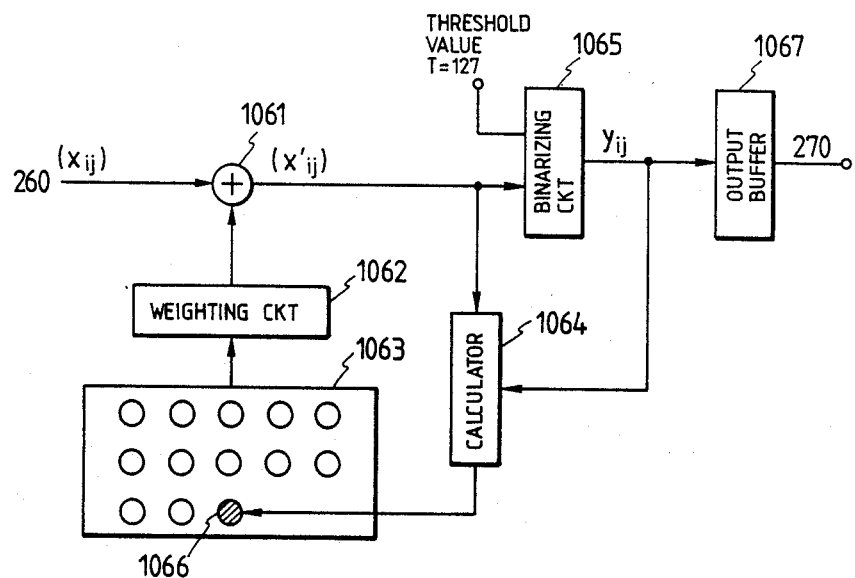
FIG. 18 is a block diagram of a binarizing circuit 1018.
FIG. 21 is a diagram for explaining the processing in a dotting circuit.

FIG. 18 is a block diagram showing the details of the binarizing circuit 1018 in FIG. 13.

The image data 260 ($x_{ij}$) output from the memory 1017 is added by an adder 1061 to the value which is derived by multiplying a weight coefficient $a_{ij}$ designated by a weighting circuit 1062 to the error $\epsilon_{ij}$ (the difference between the correction data $x'_{ij}$ which has previously been generated and the output data $y_{ij}$) stored in an error buffer memory 1063. The adding process is expressed by the following equation;

$$x'_{ij} = x_{ij} + \left( \sum_{kl} a_{kl} \epsilon_{i+k, j+l} \right) / \sum_{kl} a_{kl}$$

The weight coefficients are the same as those shown in FIG. 9.

The correction data $x'_{ij}$ is compared with the threshold value T ($D_{max}=255$ and $T=127$ in this case) by a binarizing circuit 1065, so that data $y_{ij}$ is output. $y_{ij}$ is the binarized data like $D_{max}$ or 0. The binarized data is stored in an output buffer 1067 and the output data 270 is output.

On the other hand, a calculator 1064 calculates the difference $\epsilon_{ij}$ between the correction data $x'_{ij}$ and the output data $y_{ij}$. The calculated difference is stored in an area at the position corresponding to a pixel position 1066 in the error buffer memory 1063. By repeating those operations, the binarization by the error diffusion method is executed.

As mentioned above, according to the foregoing embodiment, in the portion having no edge, for instance, in the uniform concentration portion such as highlight portion or shadow portion of an image, the dotting process is executed as a pre-processing and the binarization is executed by the error diffusion method. Therefore, since dots can be aligned in the highlight or shadow portion, a uniform fringe pattern which occurs when the error diffusion method has been executed can be Moreover, since regularity without a sense of having no noise can be formed by aligning dots, the generation of particle-shaped noise which is otherwise sensed in the highlight or shadow portion can be prevented.

Further, in the embodiment, since an image having a screen angle of 45° is formed by changing the dotting process for every block, the reduction (the space between dots is widened) of the spatial frequency when the dotting process is executed can be prevented and a smooth reproduction image can be obtained.

Since the dotting process is not executed in the edge portion, the resolution of characters, diagrams, or the like can be maintained.

Figure 19:
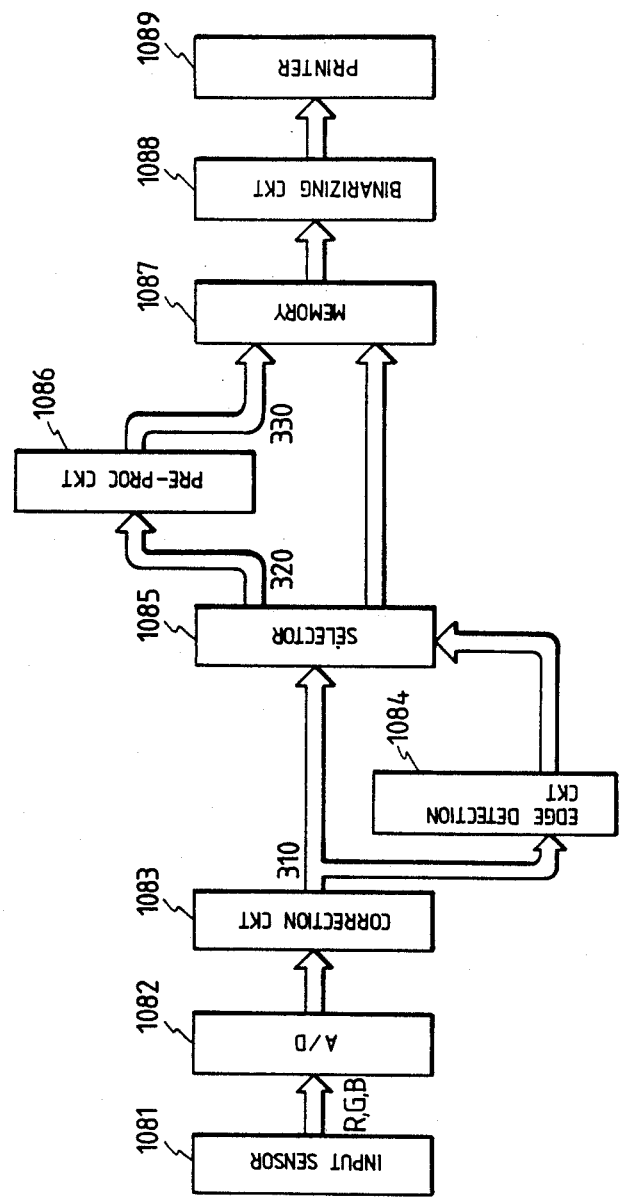
FIG. 19 is a block diagram in the case where a part of the second embodiment is changed.

FIG. 19 is a block diagram showing an embodiment in the case where the second embodiment is applied to a color image process.

The three-color-separated red, green, and blue signals are output from a color image input sensor 1081 and converted into a digital signal of eight bits for every color by an A/D converter 1082. In a correction circuit 1083, the shading correction, complementary color conversion from the RGB signal to the YMC signal, and masking processing are executed, so that yellow, magenta, and cyan signals are output. In this example, the Y, M, and C signals are represented collectively as a signal 310. Data is transferred on a block unit basis in which $3 \times 6$ pixels makeup one block for the Y, M, and C colors.

An edge detection circuit 1084, a selector 1085, a pre-processing circuit 1086, a memory 1087, and a binarizing circuit 1088 can be realized by providing the edge detection circuit 1014, selector 1015, pre-processing circuit 1016, memory 1017, and binarizing circuit 1018 in FIG. 13 for three colors, respectively. However, a construction of the pre-processing circuit 1086 is changed as shown in FIG. 20 in order to prevent color moire which is caused due to overlapping printing of dots of three colors of Y, M, and C.

Figure 20:
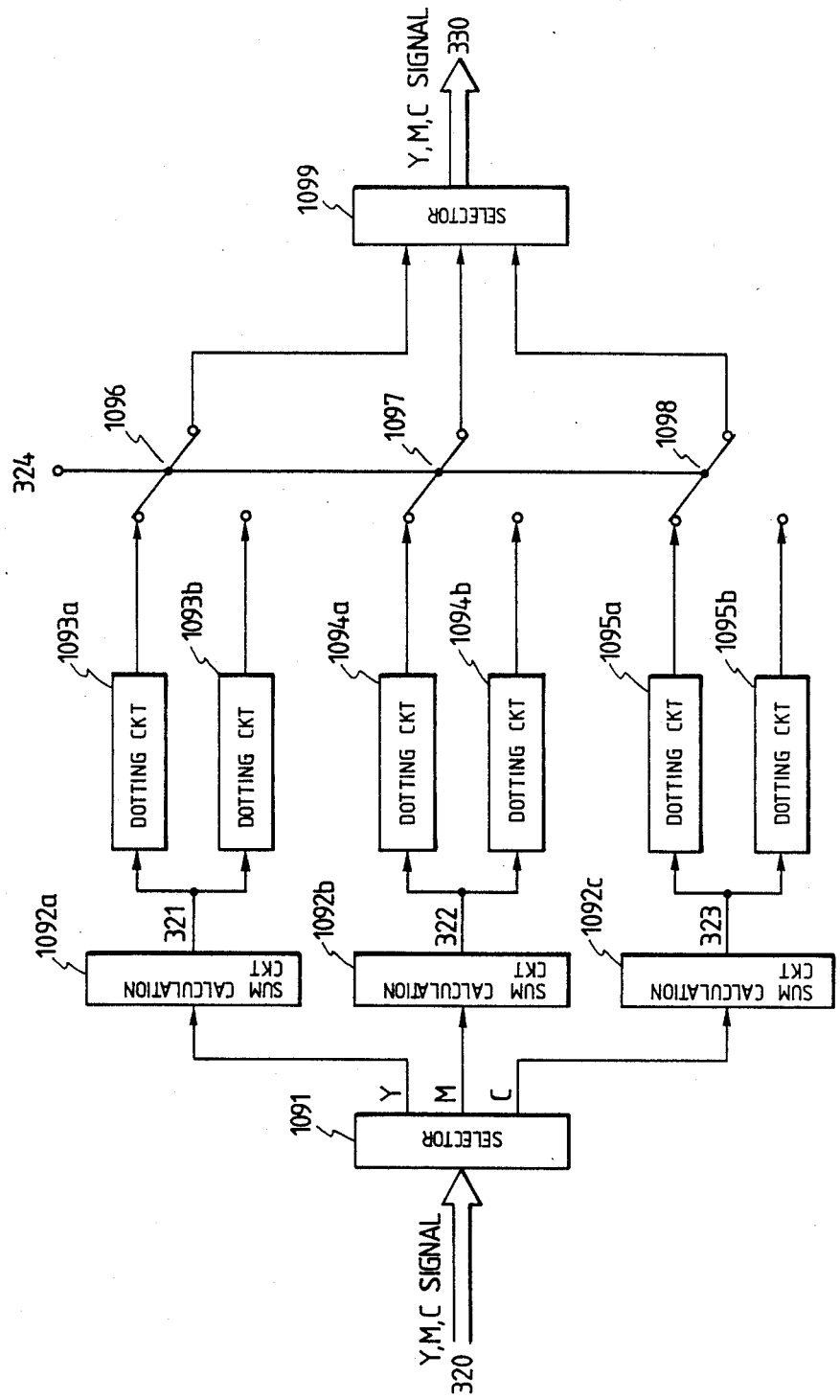
FIG. 20 is a block diagram of a pre-processing circuit 1086.

In FIG. 20, reference numeral 1091 denotes a selector to separate the YMC signal into the Y, M, and C signals. Reference numerals 1092a to 1092c denote sum calculation circuits to calculate the sum of the concentrations in a block from the Y, M, and C data. The calculated sums of the concentrations are input as signals 321, 322, and 323 to dotting circuits 1093a, 1093b, 1094a, 1094b, 1095a, and 1095b. The processes which are executed in the dotting circuits 1093a to 1095b will be described with reference to FIG. 21.

In the dotting circuit 1093a:
(i) When (signal 321)$\leq D_{max}$ ($D_{max}=255$),
  $A_{21}=$(signal 321)
  the concentrations of the other pixels$=0$
(ii) When $D_{max}<$(signal 321)$\leq 4D_{max}$,
  $A_{21}=D_{max}$
  $A_{11}=A_{22}=A_{31}=$((signal 321)$-D_{max}$)/3
  the concentrations of the other pixels$=0$
(iii) When (signal 321)$>4D_{max}$,
  $A_{11}=A_{21}=A_{22}=A_{31}=D_{max}$
  the concentrations of the other pixels$=$((signal 321)$-4D_{max}$)/14

In this manner, dots are formed. In this case, (signal denotes the sum of the concentrations which is output from the sum calculation circuit 1092a and $A_{ij}$ ($i=1, \ldots, 3, j=1, \ldots, 6$) represents the concentration of the (i, j) pixel in a block.

In the dotting circuit 1093b:
(i) When (signal 321)$\leq D_{max}$,
  $A_{24}=$(signal 321)
  the concentrations of the other pixels$=0$
(ii) $D_{max}<$(signal 321)$\leq 5D_{max}$,
  $A_{24}=D_{max}$
  $A_{14}=A_{23}=A_{25}=A_{34}=$((signal 321)$-D_{max}$)/4
  the concentrations of the other pixels$=0$
(iii) When (signal 321)$>5D_{max}$,
  $A_{14}=A_{23}=A_{24}=A_{25}=A_{34}=D_{max}$
  the concentrations of the other pixels$=$((signal 321)$-5D_{max}$)/13

In this manner, dots are formed. In this case, (signal 321) indicates the sum of the concentrations which is output from the sum calculation circuit 1092a and $A_{ij}$ ($i=1, \ldots, 3, j=1, \ldots, 6$) represents the concentration of the (i, j) pixel in a block.

In the dotting circuit 1094a:
(i) When (signal 322)$\leq D_{max}$,
  $A_{13}=$(signal 322)
  the concentrations of the other pixels$=0$
(ii) When $D_{max}<$(signal 322)$\leq 4D_{max}$,
  $A_{13}=D_{max}$
  $A_{12}=A_{14}=A_{23}=$((signal 322)$-D_{max}$)/3
  the concentrations of the other pixels$=0$
(iii) When (signal 322)$>4D_{max}$,
  $A_{12}=A_{13}=A_{14}=A_{23}=D_{max}$
  the concentrations of the other pixels$=$((signal 322)$-4D_{max}$)/14

In this manner, dots are formed. In this case, (signal 322) denotes the sum of the concentrations which is output from the sum calculation circuit 1092b and $A_{ij}$ ($i=1, \ldots, 3, j=1, \ldots, 6$) indicates the concentration of the (i, j) pixel in a block.

In the dotting circuit 1094b:
(i) When (signal 322)$\leq D_{max}$,
  $A_{16}=$(signal 322)
  the concentrations of the other pixels$=0$
(ii) When $D_{max}<$(signal 322)$\leq 4D_{max}$,
  $A_{16}=D_{max}$
  $A_{15}=A_{25}=A_{26}=$((signal 322)$-D_{max}$)/3
  the concentrations of the other pixels$=0$
(iii) When (signal 322)$>4D_{max}$,
  $A_{15}=A_{16}=A_{25}=A_{26}=D_{max}$
  the concentrations of the other pixels$=$((signal 322)$-4D_{max}$)/14

In this manner, dots are formed. In this case, (signal 322) denotes the sum of the concentrations which is output from the sum calculation circuit 1092b and $A_{ij}$ ($i=1, \ldots, 3, j=1, \ldots, 6$) indicates the concentration of the (i, j) pixel in a block.

In the dotting circuit 1095a:
(i) When (signal 323)$\leq D_{max}$,
  $A_{33}=$(signal 323)
  the concentrations of the other pixels$=0$
(ii) When $D_{max}<$(signal 323)$\leq 4D_{max}$,
  $A_{33}=D_{max}$
  $A_{23}=A_{32}=A_{34}=$((signal 323)$-D_{max}$)/3
  the concentrations of the other pixels$=0$
(iii) When (signal 323)$>4D_{max}$,
  $A_{23}=A_{32}=A_{33}=A_{34}=D_{max}$
  the concentrations of the other pixels$=$((signal 323)$-4D_{max}$)/14

In this manner, dots are formed. In this case, (signal 323) denotes the sum of the concentrations which is output from the sum calculation circuit 1092c and $A_{ij}$ indicates the concentration of the (i, j) pixel.

In the dotting circuit 1095b:
(i) When (signal 323)$\leq D_{max}$,
  $A_{36}=$(signal 323)
  the concentrations of the other pixels$=0$
(ii) When $D_{max}<$(signal 323)$\leq 4D_{max}$,
  $A_{36}=D_{max}$
  $A_{25}=A_{26}=A_{35}=$((signal 323)$-D_{max}$)/3
  the concentrations of the other pixels$=0$
(iii) When (signal 323)$>4D_{max}$,
  $A_{25}=A_{26}=A_{35}=A_{36}=D_{max}$
  the concentrations of the other pixels$=$((signal 323)$-4D_{max}$)/14

In this manner, dots are formed. In this case, (signal 323) denotes the sum of the concentrations which is output from the sum calculation circuit 1092c and $A_{ij}$ ($i=1, \ldots, 3, j=1, \ldots, 6$) indicates the concentration of the (i, j) pixel in a block.

By constructing the dotting circuits 1093a to 1095b as mentioned above, a screen angle can be added for every color. A fringe pattern can be improved as mentioned above and color moiré due to faulty registration or the like can be also prevented by changing the dot forming positions for every color. That is, by periodically forming dots by adding a screen angle in advance for every color instead of forming dots of each color without periodicity, it is possible to form an image which seems to have a uniform concentration due to the integrating effect of the eyes and the occurrence of the color moiré can be prevented.

Further, in this embodiment, the size of block has been set to 3×6 pixels for each of three colors. However, it is also possible to construct in a manner such that the size of block is changed for every color and the number of dots in a block is changed for every block, thereby enabling a screen angle to be set for every color.

In FIG. 20, reference numerals 1096 to 1098 denote switches. The switch 1096 switches the outputs of the dotting circuits 1093a and 1093b in accordance with the input signal 324 Similarly, the switches 1097 and 1098 also switch the outputs of the dotting circuits 1094a and 1094b and the outputs of the dotting circuits 1095a and 1095b, respectively. A selector 1099 outputs data from the switches 1096 to 1098 as a YMC signal 330.

As described above, according to this embodiment, by executing the dotting process to add a screen angle, occurrence of fringe patterns and particle-shaped noise in the highlight or shadow portion of an image where no edge exists can be prevented.

On the other hand, for a color image, by adding a screen angle for every color, occurrence of fringe patterns can be prevented and color deviation (color moiré) which is due to faulty registration of the resist or the like can be prevented.

The dotting method to add a screen angle is not limited to this embodiment but can be also realized by a block other than 3×6 pixels or by changing the dot forming positions.

In the foregoing first and second embodiments, the dotting process has been performed as a pre-processing in the portions other than the edge portions of an image. However, in the third embodiment, which will be explained hereinbelow, the dotting process is performed in the areas of the highlight portion other than the edge portions of an image.

This is because, since a fringe pattern or particle-shaped noise which are generated when an image is processed by the error diffusion method are inconspicuous in the shadow portion of an image, the dotting process is omitted.

Thus, the image process can be performed at a high speed.

FIG. 22 is a block diagram showing the third embodiment of the invention. The image data read by an input sensor 2011 having a photoelectric converting device such as a CCD or the like and a drive system to scan the photoelectric converting device is sequentially sent to an A/D converter 2012. For instance, the A/D converter 2012 converts the data of each pixel into digital data of eight bits. Thus, the image data is digitized into the data having gradations of 256 levels. In a correction circuit 2013, the shading correction and the like to correct the sensitivity variation of the sensors or the illuminance variation due to the illuminating light source are executed by digital arithmetic operating processes. Next, a corrected signal 400 is input to an edge detection circuit 2014 and a selector 2016. At this time, data is transferred on a block unit basis in which m×n pixels construct one block. This embodiment will be described assuming that m=8 and n=8.

The edge detection circuit 2014 discriminates whether edges exist in a block or not. As an edge discriminating method, there has been known a method of using Laplacians, a method whereby the difference between the minimum and maximum values in a block is calculated and a discrimination is made in a manner such that edges exist if the difference is the threshold value $T_1$ ($T_1=15$ in this case) or more and that no edge exists if the difference is smaller than $T_1$, or this like. The latter method is used in the embodiment. ($T_1$ is not limited to 15.)

The reason why the presence or absence of edges in a block is discriminated is to avoid the deterioration of the resolution which is caused when the block having edges is dotted. In this embodiment, the dotting process is not executed in the portion where edges exist.

The presence or absence of edges is discriminated by the edge detection circuit 2014. A "1" level signal is output if edges exist and a "0" level signal is output if no edge exists. Such a "1" or "0" signal is output as a signal 410 from the edge detection circuit 2014. The maximum value obtained by the edge detection circuit 2014 is output as a signal 420. The signals 410 and 420 are input to a highlight detection circuit 2015, by which the signal 420 is compared with a threshold value $T_2$ ($T_2=25$ in this case). If the signal 420 is smaller than $T_2$, a "0" level signal is output to indicate that the image is the highlight portion. If the signal 420 is larger than $T_2$, a "1" level signal is output to indicate that the image is not the highlight portion. The OR of the "0" or "1" output signal and the signal 410 is calculated and the result is input as a signal 430 to the selector 2016. That is, when no edge exists in a block and, at the same time, the image is the highlight portion, the signal 430 is set to "0". In the other cases, the signal 430 is set to "1".

The signal 430 is input to the selector 2016. If the signal 430 is set to "0", the signal 400 input to the selector 2016 is transferred as a signal 440 to a pre-processing circuit 2017 on a block unit basis. On the contrary, when the signal 430 is set to "1", the signal 400 is transferred as a signal 450 to a memory 2018 on a block unit basis.

The selector 2016 is provided so as to execute the pre-processing for only the highlight portion having no edge.

In the pre-processing circuit 2017, the sum of the block data which were input as the signal 440 is calculated and there is executed a dotting process such that the sum of the concentration data in a block is redistributed as a concentration(s) of one or a plurality of pixels in a block. By forming dots, regularity can be provided for the dots. When performing the binarization by the error diffusion method or the like, the particle-shaped noise which are generated in the edgeless highlight portion of an image can be reduced. The data output from the pre-processing circuit 2017 is input to the memory 2018. Data 470 which were read out of the memory 2018 on a pixel unit basis are input to a binarizing circuit 2019 and binarized. The result is input as a signal 480 to a printer 2020 and output as an image by the printer 2020.

FIG. 23 is a block diagram of the pre-processing circuit 2017. The signal 440 output from the selector 2016 is input to a sum calculation circuit 2021, by which the sum S of the concentrations of 64 (8×8 pixels) data in a block is calculated.

$$S = \sum_{i=1}^{8} \sum_{j=1}^{8} D_{ij}$$

$D_{ij}$ indicates the concentration of the (i, j) pixel in a block. The sum S of the concentrations is output as a signal 441 to a dotting circuit 2022. FIG. 24 is a diagram showing the concentration data of (8×8 pixels) in a block. $D_{ij}$ (i=1, ..., 8, j=1, ..., 8) denotes the concentration of the (i, j) pixel. FIG. 25 is a diagram showing the concentrations after the dotting process was executed.

$A_{ij}$ (i=1, ..., 8, j=1, ..., 8) denotes the concentration of the (i, j) pixel. The operation of the dotting circuit 2022 will be described with reference to FIG. 25. $D_{max}$ denotes the concentration data of a dot which is output by the printer and is set to 255 in this case.

In the dotting circuit 2022:
(i) When $S \leq D_{max}$,
$A_{11} = S$
the concentrations of the other pixels = 0
(ii) When $D_{max} < S \leq 2D_{max}$,
$A_{11} = D_{max}$
$A_{55} = S - D_{max}$
the concentrations of the other pixels = 0
(iii) When $2D_{max} < S \leq 3D_{max}$,
$A_{11} = A_{55} = D_{max}$
$A_{51} = S - 2D_{max}$
the concentrations of the other pixels = 0
(iv) When $3D_{max} < S \leq 4D_{max}$,
$A_{11} = A_{55} = A_{51} = D_{max}$
$A_{15} = S - 3D_{max}$
the concentrations of the other pixels = 0
(v) When $S > 4D_{max}$,
$A_{11} = A_{15} = A_{51} = A_{55} = D_{max}$
the concentrations of the other pixels = $(S - 4D_{max})/60$ In this manner, dots are formed. In this case, S denotes a sum signal 441 of the concentrations which is output from the sum calculation circuit 2021 and $A_{ij}$ (i and j = 1, ..., 8) indicates the concentration of the (i, j) pixel in a block after completion of the dotting process.

The formation of dots in the foregoing construction means that a periodicity of dots is made in the highlight portion.

Therefore, in the binarizing circuit 2019, when the binarization is executed by the error diffusion method, in the highlight portion, dots appear (become ON) at the period made by the pre-processing circuit 2017. By forming dots and adding the periodicity as mentioned above, the particle-shaped noise in the highlight portion can be reduced.

Since the construction of the binarizing circuit 2019 is the same as that in FIGS. 8 and 18, its detailed description is omitted.

Figure 26:
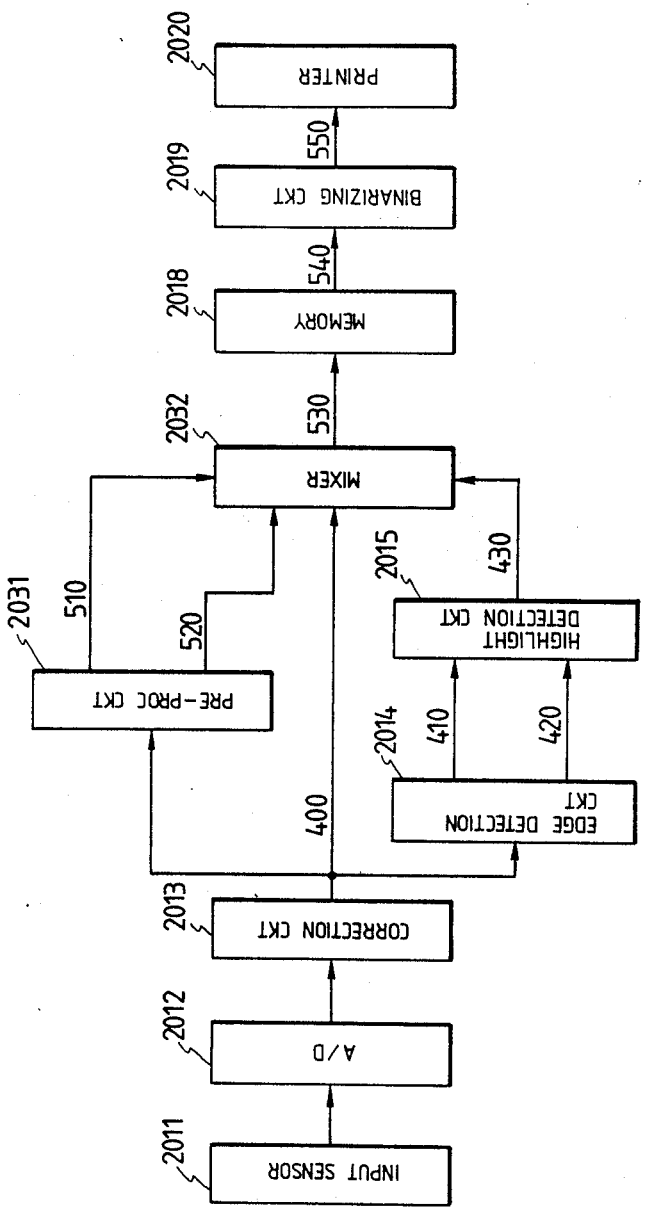
FIG. 26 is a block diagram in the case where a part of the third embodiment of FIG. 22 is changed.

FIG. 26 is a block diagram in the case where a part of the foregoing embodiment is changed. The corrected signal 400 output from the correction circuit 2013 is input to a pre-processing circuit 2031, a mixer 2032, and the edge detection circuit 2014. While the operations of the edge detection circuit 2014 and highlight detection circuit 2015 are the same as those in the embodiment, the threshold value $T_2$ is set to 50. The signal 430 output from the highlight detection circuit 2015 is input to the mixer 2032.

Figure 27:
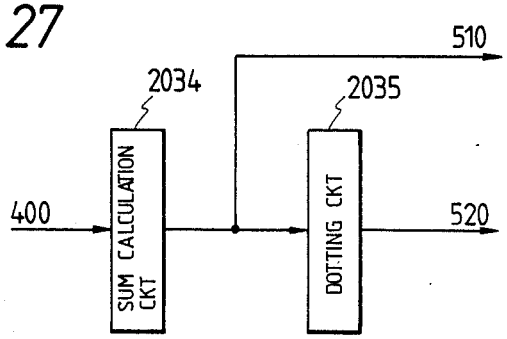

FIG. 27 is a block diagram showing the details of the pre-processing circuit 2031.

Although the operations of a sum calculation circuit 2034 and a dotting circuit 2035 are the same as those in the foregoing embodiment, an output of the sum calculation circuit 2034 is set to a signal 510 and an output of the dotting circuit 2035 is set to a signal 520.

Figure 28:
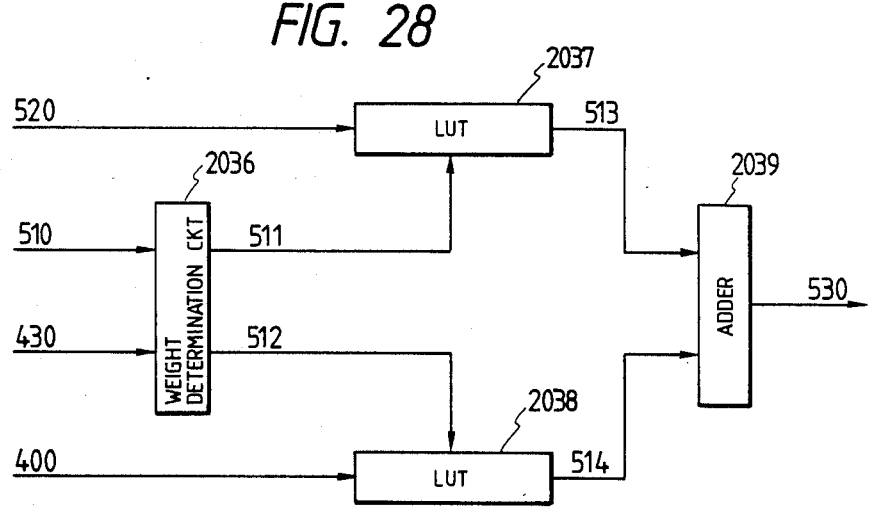
FIG. 28 is a block diagram of a mixer.

FIG. 28 is a block diagram of the mixer 2032.

The signals 430 and 510 are input to a weight determination circuit 2036. When the signal 430 is set to "1", a signal 511 is always set to "0" and a signal 512 is always set to "1". There is the following relation between the signals 511 and 512.

$0 \leq$ (signal 511) $\leq 1$ (signal 512) = 1 − (signal 511)

Therefore, by setting such that (signal 511) = $\alpha$, (signal 512) can be expressed by $1 - \alpha$.

Figure 29:
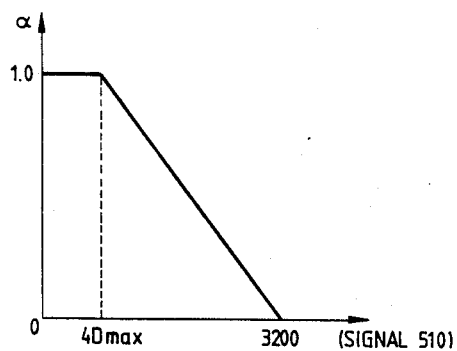
FIG. 29 is a diagram showing the relation between a signal 510 and α.

Next, when the signal 430 is set to "0", that is, in the case of the highlight portion (the maximum value in a block is 50 or less) and the edge portion, the values of the signals 511 and 512 are changed in dependence on the value of the sum of the concentrations in a block of the signal 510. Such a relation is shown in FIG. 29. Until the value of the signal 510 is $4D_{max}$, $\alpha = 1.0$ and, thereafter, the value of $\alpha$ linearly decreases to 3200 (signal 510). Although there is a linear relation between $\alpha$ and the signal 510 as shown in FIG. 29, the invention is not limited to such a relation. For instance, the value of $\alpha$ can be reduced in a logarithmic manner or the like. The signals 511 and 512 are input to LUTs (Look-Up Tables) 2037 and 2038 and weighted as shown in the following equations;

In the LUT 2037, $\alpha \cdot A_{ij}$

In the LUT 2038, $(1 - \alpha) \cdot D_{ij}$

Therefore, in the adder 2039, $\alpha \cdot A_{ij} + (1 - \alpha) \cdot D_{ij}$ is calculated and the result is output as a signal 530.

The signal 530 is input to the memory 2018. The constructions of the memory 2018, binarizing circuit 2019, and printer 2020 are the same as those in the foregoing embodiment.

By providing the mixer as mentioned above, the switching between the dotted portion and the non-dotted portion can be inconspicuously and smoothly performed.

As another embodiment, in the case of applying the embodiment to a color image, it is sufficient to provide the circuits in FIG. 22 or 26 for three colors of Y, M, and C, respectively. On the other hand, in the case of adding black, it is sufficient to provide the circuits for four colors.

Further, even in the embodiment of FIG. 22, the dot forming positions can be changed for every color or dots can be also formed by adding a screen angle as shown in the first or second embodiment.

As explained above, according to the embodiment of FIG. 22, since the dotting process is executed for the highlight portions other than the edge portions of an image, the processing can be performed at a higher speed than in the case of executing the dotting process for all of the areas other than the edge portions.

In the described embodiments, after the dotting process has been described as being executed, the binarization has been executed by the error diffusion method However, it is also possible to construct the apparatus to execute the dotting processing after the image data is binarized by the error diffusion method.

On the other hand, even in such a case, as shown in the first or second embodiment, the dot forming positions can be also changed in accordance with a color and a screen angle can be also added when forming dots.

Although the preferred embodiments have been described with respect to the case where the binarization is executed by the error diffusion method (least mean error method) as a digitizing method of image data, the invention can be also similarly applied to the case of converting the image data into multi-values by the error diffusion method.

Although the present invention has been described in detail with respect to the preferred embodiments, the invention is not limited to the foregoing embodiments, but many modifications and variations are possible within the spirit and scope of the appended claims of the invention.

We claim:

1. An image processing apparatus comprising:
input means for inputting plural color image data;
first processing means for performing a dotting process on each of the color image data input by said input means such that density data of plural pixels are processed to concentrate a density to a predetermined pixel in a predetermined area consisting of said density data of plural pixels;
second processing means for quantizing the color image data dotting-processed by said first processing means; and
outputting means for outputting a color image obtained by said second processing means,
wherein said first processing means performs the dotting process by changing for each color a position of the predetermined pixel in the predetermined area to which the density is concentrated such that a dot position of each output color image does not overlap with others, and
wherein said second processing means quantizes the color image data in which the density is concentrated on the pixel position in said predetermined area, the pixel position for each color being different from others.

2. An apparatus according to claim 1, wherein said input means comprises:
means for reading an original and for generating a plurality of color image data; and
dividing means for dividing each of said plurality of color image data into areas each consisting of a plurality of density data of a pixel.

3. An apparatus according to claim 2, wherein said first processing means executes the dotting process on the basis of a sum of the plurality of density data of each of the areas provided by said dividing means.

4. An apparatus according to claim 1, wherein said first processing means executes the dotting process so as to add a screen angle to each of the plurality of color image data input by said input means.

5. An apparatus according to claim 1, wherein said second processing means quantizes the color image data by a method of correcting the difference between the input data before the quantization and the output data after the quantization.

6. An apparatus according to claim 1, wherein said second processing means quantizes the color image data by binarizing them by an error diffusion method.

7. An apparatus according to claim 1, further having detecting means for detecting a feature of an image from the plurality of color image data input by said input means.

8. An apparatus according to claim 7, further having selecting means for selecting whether the dotting process by the first processing means is executed or not, and wherein said selecting means selects whether the dotting process is executed or not on the basis of the feature of the image detected by said detecting means.

9. An apparatus according to claim 8, wherein said selecting means selects the execution of the dotting process by the first processing means when it is detected by the detecting means that the image is an edgeless portion.

10. An apparatus according to claim 1, wherein said outputting means records the color image on the basis of the result of the quantization by said second processing means.

11. An image processing apparatus comprising:
input means for inputting plural color image data;
first processing means for performing a dotting process on each of the color image data input by said input means such that density data of plural pixels are processed to concentrate a density to a predetermined pixel in a predetermined area consisting of said density data of plural pixels;
second processing means for binarizing the color image data dotting-processed by said first processing means; and
outputting means for outputting a color image obtained by said second processing means,
wherein said first processing means performs the dotting process by changing for each color a position of the predetermined pixel in the predetermined area to which the density is concentrated such that a dot position of each output color image does not overlap with others, and
wherein said second processing means binarizes the color image data by a method of correcting a difference between the data before binarization and the data after the binarization.

12. An apparatus according to claim 11, wherein said input means comprises:
means for reading an original and for generating a plurality of color image data; and
dividing means for dividing each of said plurality of color image data into areas each consisting of a plurality of density data of a pixel.

13. An apparatus according to claim 12, wherein said first processing means executes the dotting process on the basis of a sum of the plurality of density data of each of the areas provided by said dividing means.

14. An apparatus according to claim 11, wherein said first processing means executes the dotting process so as to add a screen angle to each of the plurality of color image data input by said input means.

15. An apparatus according to claim 11, further having detecting means for detecting a feature of an image from the plurality of color image data input by said input means.

16. An apparatus according to claim 15, further having selecting means for selecting whether the dotting process by the first processing means is executed or not, and wherein said selecting means selects whether the dotting process is executed or not on the basis of the feature of the image detected by said detecting means.

17. An apparatus according to claim 11, wherein said outputting means records the color image on the basis of the result of the binarization by said second processing means.

18. An image processing apparatus comprising:
first processing means for binarization-processing image data of one pixel using an error diffusion method;
second processing means for adding a screen angle using image data of plural pixels existing in an area larger than an area in which said image data of one pixel is processed; and
recording means for recording the image data processed by said first and second processing means.

19. An apparatus according to claim 18, further having means for reading an original and generating a plurality of color image data.

20. An apparatus according to claim 19, wherein said first processing means performs binarization by an error diffusion method on each of said plurality of color image data.

21. An apparatus according to claim 19, wherein said second processing means performs the dotting process so as to add a screen angle to each of said plurality of color image data.

22. An apparatus according to claim 18, wherein said first processing means performs the binarization process by an error diffusion method for the image data to which the screen angle has been added by said second processing means.

23. An image processing apparatus comprising:
input means for inputting image data;
first detecting means for detecting a first feature of an image from the image data;
second detecting means for detecting a second feature of the image from the image data;
first processing means for performing a dotting process on the image data on the basis of the first and second features detected by said first and second detecting means; and
second processing means for digitizing the image data which has been dotting-processed by said first processing means,
wherein said first detecting means detects whether edges exist in the image or not from the image data, and
wherein said second detecting means detects whether the image is a highlight image or not from the image data.

24. An apparatus according to claim 23, wherein said first processing means performs the dotting process on the image data when the absence of edges is detected by the first detecting means and, at the same time, when it is detected by the second detecting means that the image is the highlight image.

25. An apparatus according to claim 23, wherein said second processing means performs the digitizing process by an error diffusion method on the image data which has been dotting-processed by said first processing means.

* * * * *

UNITED STATES PATENT AND TRADEMARK OFFICE
CERTIFICATE OF CORRECTION

PATENT NO. : 4,958,218
DATED : September 18, 1990
INVENTOR(S) : AKIHIRO KATAYAMA, ET AL.

Page 1 of 4

It is certified that error appears in the above-identified patent and that said Letters Patent is hereby corrected as shown below:

IN [57] ABSTRACT

Line 5, "on" should read --to--.
    Line 6, "to" should read --on--.

IN [56] REFERENCES CITED

U.S. PATENT DOCUMENTS, "Tissue et al." should read --Tisue et al.--.

COLUMN 1

Line 16, "reproduce" should read --to reproduce--.
    Line 43, "pseudo-" should read --(pseudo-)--.
    Line 44, "dotted;" should read --dotted--.

COLUMN 2

Line 30, "a" (both occurrences) should be deleted.
    Line 57, "and" (second occurrence) should be deleted.

COLUMN 3

Line 32, "of a (block)" should read --(of a block)--.
    Line 34, "of a (block)" should read --(of a block)--.
    Line 37, "third" should be deleted.
    Line 55, "signals bits" should read --signals,-- and "bits for," should read --bits, for--.

UNITED STATES PATENT AND TRADEMARK OFFICE
CERTIFICATE OF CORRECTION

PATENT NO. : 4,958,218

DATED : September 18, 1990

INVENTOR(S) : AKIHIRO KATAYAMA, ET AL.

It is certified that error appears in the above-identified patent and that said Letters Patent is hereby corrected as shown below:

COLUMN 4

Line 6, "3 X 3size," should read --3 X 3 size,--.
Line 15, "ods but" should read --ods, but--.

COLUMN 5

Line 9, "(1);" should read --(1):--.
Line 15, "the" should read --this--.
Line 16, "this" should read --the--.
Line 22, "equation (2);" should read --equation (2):--.
Line 42, "assumes $S_c$)" should read --assumes value $S_c$)--.

COLUMN 6

Line 1, "$\alpha_{ij}$" should read --$\epsilon_{ij}$--.
Line 2, "data $X_{ij}$)" should read --data $Y_{ij}$)--.
Line 4, "equation;" should read --equation:--.
Line 35, "value $S_y$" should read --value $S_Y$--.
Line 38, "cases, when" should read --cases. When--.
Line 42, "equation;" should read --equation:--.
Line 53, "equation (4);" should read --equation (4):--.

COLUMN 7

Line 14, "assume" should read --assumes--.

COLUMN 8

Line 40, "portion" should read --portions--.

UNITED STATES PATENT AND TRADEMARK OFFICE
CERTIFICATE OF CORRECTION

PATENT NO. : 4,958,218
DATED : September 18, 1990
INVENTOR(S) : AKIHIRO KATAYAMA, ET AL.

It is certified that error appears in the above-identified patent and that said Letters Patent is hereby corrected as shown below:

COLUMN 9

Line 36, "block;" should read --block:--.
Line 60, "block;" should read --block:--.

COLUMN 10

Line 13, "equation;" should read --equation:--.
Line 43, "be" should read --be reduced.--.
Line 44, "having" should be deleted.
Line 45, "no" should be deleted.

COLUMN 11

Line 3, "makeup" should read --make up--.
Line 37, "(signal" should read --(signal 321)--.

COLUMN 14

Line 5, "this" should read --the--.
Line 6, "the" should read --this--.
Line 63, "calculated." should read --calculated:--.

COLUMN 15

Line 3, "circuit 2022. FIG. 24" should read
    --circuit 2022. ¶ FIG. 24--.
Line 6, "pixel. FIG. 25" should read --pixel. ¶ FIG. 25--.
Line 44, Close up right margin.
Line 45, Close up left margin.

UNITED STATES PATENT AND TRADEMARK OFFICE
CERTIFICATE OF CORRECTION

PATENT NO. : 4,958,218
DATED : September 18, 1990
INVENTOR(S) : AKIHIRO KATAYAMA, ET AL.

It is certified that error appears in the above-identified patent and that said Letters Patent is hereby corrected as shown below:

COLUMN 16

Line 30, "equations;" should read --equations:--
Line 65, "described as being" should be deleted.
Line 66, "been executed" should read --been described as being executed-- and "method" should read --method.--.

Signed and Sealed this

Thirteenth Day of October, 1992

Attest:

DOUGLAS B. COMER

Attesting Officer     Acting Commissioner of Patents and Trademarks